US005786881A

United States Patent [19]
Monroe

[11] Patent Number: 5,786,881
[45] Date of Patent: &Jul. 28, 1998

[54] COMPOSITE SPECTACLES

[75] Inventor: Craig L. Monroe, San Juan Capistrano, Calif.

[73] Assignee: Woody's Originals, Inc., Solana Beach, Calif.

[*] Notice: The term of this patent shall not extend beyond the expiration date of Pat. No. 5,537,161.

[21] Appl. No.: 666,967

[22] Filed: Jun. 20, 1996

Related U.S. Application Data

[63] Continuation of Ser. No. 306,637, Sep. 15, 1994, Pat. No. 5,537,161.

[51] Int. Cl.[6] .................................................. G02C 11/02
[52] U.S. Cl. ................................................ 351/51; 351/41
[58] Field of Search ................................ 351/41, 51, 83, 351/111, 158

[56] References Cited

U.S. PATENT DOCUMENTS

| | | |
|---|---|---|
| 2,985,556 | 5/1961 | Rowland . |
| 3,288,666 | 11/1966 | Dacey . |
| 4,031,276 | 6/1977 | Nakamura et al. . |
| 4,255,024 | 3/1981 | de Monts et al. ............ 351/41 |
| 5,208,614 | 5/1993 | Jannard . |
| 5,537,161 | 7/1996 | Monroe ....................... 351/51 |

OTHER PUBLICATIONS

Chevassus, Charnieres Hinges specification sheet, 1990.

Encylopedia of Science & Technology, "Wood Products", pp. 693, 695, 1982.

Primary Examiner—Hung X. Dang
Attorney, Agent, or Firm—Knobbe, Martens, Olson & Bear, LLP

[57] ABSTRACT

Spectacle frames and earstems made of composite material comprising a plurality of resin saturated wood laminates compressed into a densified form. The frames and earstems are machined from a single block of the densified wood using a CNC machine. The earstems are attached to the frames with spring hinges. The contours of the frames and earstems reveal varying laminate layers to create an attractive wood grain or color pattern.

13 Claims, 7 Drawing Sheets

COMPOSITE SPECTACLES

This application is a continuation of U.S. Pat. application Ser. No. 08/306,637, filed Sep. 15, 1994, now U.S. Pat. No. 5,537,161.

FIELD OF THE INVENTION

This invention relates generally to spectacles and, more particularly, to wooden sunglass frames and a method for making the same.

BACKGROUND OF THE INVENTION

The frames of spectacles, such as sunglasses, include portions which surround the lenses, and portions which are hingedly connected on opposite sides to earstems that extend rearwardly around the wearer's ears. Such frames are commonly manufactured of any of a variety of thermoplastic materials which are well known in the art. These thermoplastic materials may be transparent or dyed various colors.

Sunglass frames are typically molded. A very few custom frames are crafted by hand. One such type of custom frame is formed from a plurality of small pieces of wood glued together. By its nature, the handmade manufacturing process for these custom glasses is extremely time consuming and prohibitively expensive to the consumer.

Certain manufacturers utilize computer numerical control (CNC) machines in a portion of the manufacturing process of thermoplastic frames for sunglasses. The frames begin as flat pieces of thermoplastic material and are cut on the CNC machine to form a flat frame shape. After the machining step, the frames are bent, sometimes with the use of heat, to form the final 3-dimensional curvilinear shape which conforms to the head of the wearer. Again, given the complexity of this process, the end cost to the wearer is quite high.

There is therefore a need for a spectacle frame with a custom appearance which is relatively inexpensive to produce.

SUMMARY OF THE INVENTION

The present invention provides an improved spectacle comprising a frame and a pair of ear pieces attached to the frame. Both the frame and the ear pieces are of unitary construction and formed from densified wood. Preferably, the ear pieces are attached on either side of the rear of the frame by flexible hinges. The hinges permit the ear pieces to lie flat against a rear face of the frame and be swung outward beyond an angle of 90° with respect to the frame. The densified wood is relatively rigid and the flexible hinges alleviate the risk of damage to the wood from outward movement of the ear pieces past a 90° with respect to the frame. The flexible hinges may comprise spring-loaded hinges.

The frame of the spectacles is adapted to receive a pair of lenses which are comprised of material, such as polycarbonate, that is more flexible than the densified wood. In a preferred embodiment, the densified wood is constructed of a plurality of laminates, each laminate being significantly smaller than the thickness of the frames or the ear pieces. In this manner, a plurality of laminates are exposed across the width of the frame and ear pieces. Desirably, the plurality of laminates include different colored laminates, and the frame is contoured to provide an exterior surface which exposes the different color laminates. The colored laminations may be formed by dying the individual wood laminates. In this manner, the frames have a multicolored outer appearance. Prior to forming, the densified wood laminates comprise wood veneers saturated in a resin, preferably a phenolic resin. Additionally, the wood laminates are preferably chosen from a group consisting of oak, ash, and birch.

The present invention also encompasses an improved method of manufacturing spectacles including the steps of cutting a frame and a pair of ear pieces from densified wood. The cutting step is preferably accomplished with the use of a bit in a computer numerical controlled (CNC) machine. The densified wood comprises a plurality of parallel laminates and the method includes orienting the parallel laminates relative to the cutting bit so that the cut frames lie generally in a plane parallel to the laminates. Furthermore, the cutting step includes forming an exterior surface of the frames which exposes a plurality of the laminates.

After the step of cutting the frame from densified wood, the preferred method includes tumbling the frame in a vibratory tumbler to produce a smooth exterior surface. The preferred method also includes attaching hinges to the frame for connecting ear pieces thereto. The step of attaching the hinges to the frame and to the ear pieces may be accomplished prior to the step of tumbling the frame smooth. In one preferred embodiment, the step of tumbling the frames and ear pieces smooth includes tumbling the frames in a plastic media having a conical shape. Furthermore, the step of tumbling the frames and ear pieces smooth may comprise tumbling the frames in a media comprising a fine grit, such as corn cob grit. After the step of tumbling the frame smooth, lenses are inserted into the frames. The lenses are preferably dual-polarized polycarbonate lenses.

According to another aspect of the present invention, a method of making spectacles includes providing a material comprised of a plurality of laminates, and cutting the material in the shape of a spectacle frame using a CNC machine. The cutting step includes shaping the frame with a thickness substantially greater than the thickness of the laminates. Furthermore, the step of shaping the frames comprises exposing a plurality of laminates to form an exterior surface of the frame.

In accordance with yet another aspect of the present invention, a pair of spectacles comprises a frame and a pair of ear pieces formed of composite material having a plurality of laminates. The frame and ear pieces are machined from a block of the composite material so that a plurality of laminates are visible on an exterior surface. Preferably, the laminates comprise different colors and so a plurality of different colors are visible on the exterior surface of the frame. Additionally, the colored laminates may be arranged in a regular pattern and the spectacle frames are formed generally in a plane parallel to the laminates. In this manner, a symmetric repeated pattern of colored laminates is formed on the exterior surface of the spectacle frames due to the symmetrical contour of the spectacle frames.

BRIEF DESCRIPTION OF THE DRAWINGS

FIG. 3b is an elevational view of the sunglass frame of FIG. 3a;

FIG. 4b is a plan view of the earstem of FIG. 4a;

DESCRIPTION OF THE PREFERRED EMBODIMENTS

Figure 1:
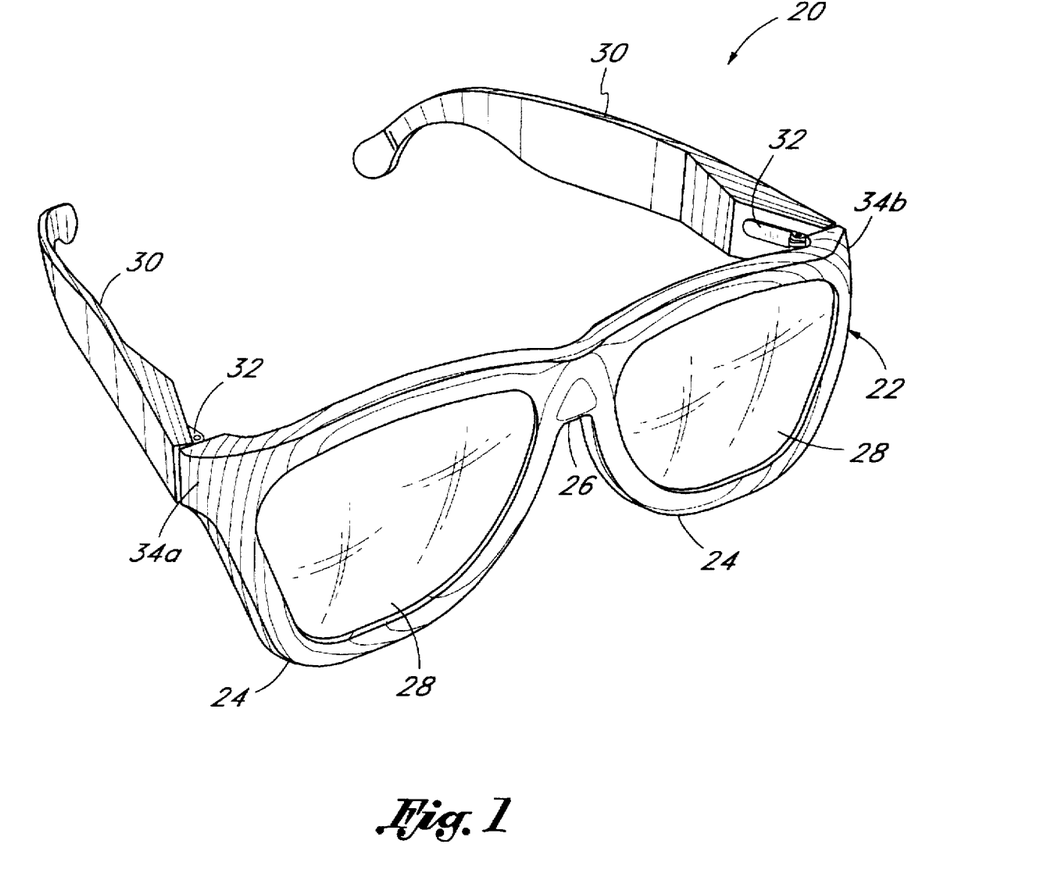
FIG. 1 is a perspective view of an exemplary pair of composite spectacles constructed as sunglasses.

With reference to FIG. 1, a pair of sunglasses 20 comprise a front frame 22 having a pair of rims 24 joined at a nose piece 26 and a pair of rearwardly extending ear pieces or earstems 30. The rims 24 are shaped to hold a pair of lenses 28. The earstems 30 are hingedly connected to left and right temples 34a, 34b of the frame 22 with the use of hinges 32.

Figure 2:
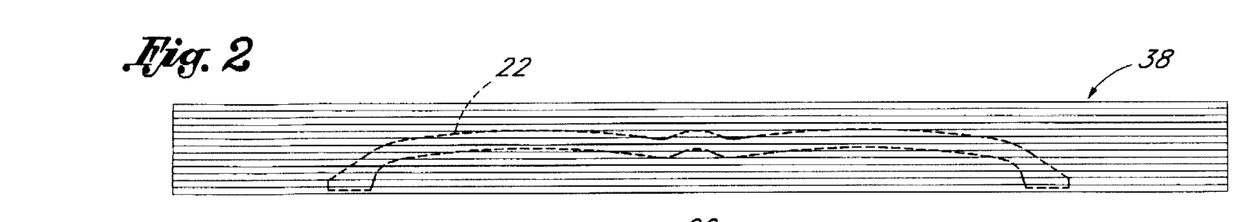
FIG. 2 is an elevation view of a composite block of wood used in forming the sunglass frames of the present invention with the outline of a preferred version of the sunglass frames superimposed in dashed lines thereon.
Figure 3A:
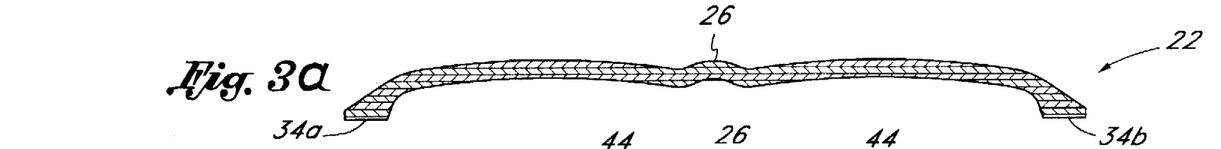
FIG. 3a is a plan view of an embodiment of the sunglass frames.

Now with reference to FIGS. 2 and 3a, it can be seen that the frame 22 of the sunglasses 20 is formed in a curvilinear shape to conform to the face of a wearer. More particularly, the nose piece 26 extends farther forward than the right and left temples 34a,b. FIG. 2 shows a laminated blank 38 used in forming the sunglasses 20 with the plan outline of the frames 22 superimposed thereupon. It is thus readily apparent that the curvilinear contour of the frames 22 crosses over the junctions between laminates in the blank 38.

Figure 3B:
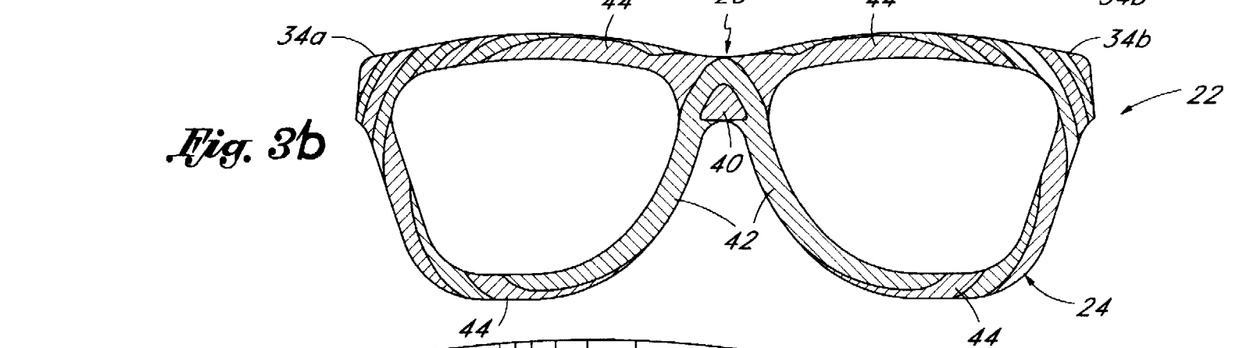

In the plan view of FIG. 3a, one can readily make out the longitudinal planar laminate layers. When looking at FIG. 3b, one sees the contour lines across the layers of laminates, much like a topographical map. A small section of a first laminate 40 is seen at the nosepiece 46. A section of a second laminate 42, adjacent the first laminate 40 in the original blank 38 continues from the nosepiece 46 down around the rims 24. The two laminates 40 and 42 thus comprise the forward most projections of the frame 22. Interrupted sections of a third laminate 44 extend on either side of the second laminate 42 in the area of the nosepiece 26, and adjacent the second laminate 42 on a lower portion of the rims 24. From that point outward on the frames 22, the curvature becomes relatively steep and thus the bands of laminates are grouped closer together toward the temples 34a, 34b. It will be appreciated that when the individual laminates in the blank 38 are composed of different colors or shades, a highly unusual and appealing pattern appears on the frames 22. The appearance is enhanced by the irregular borders between bands or sections of exposed laminates. In other words, contour surfaces which run nearly parallel to the planar laminates create an extended border exhibiting a blend of two adjacent laminates in a fringing effect. Conversely, contour surfaces which are perpendicular to the planar laminates create more abrupt borders.

Figure 4A:
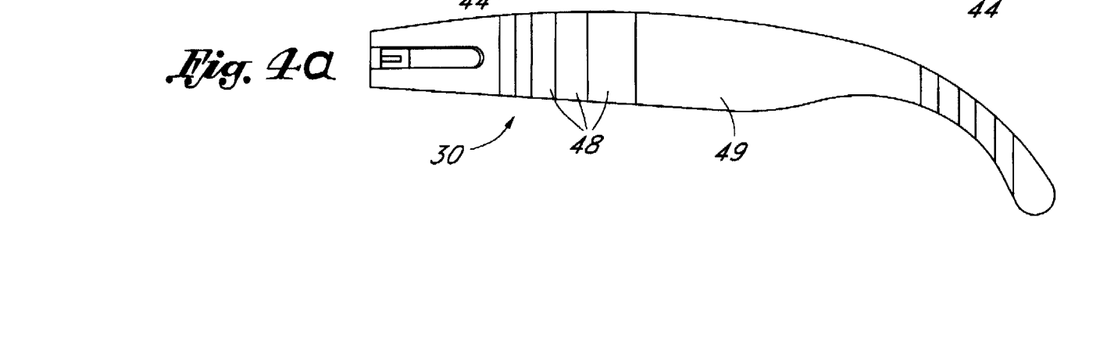
FIG. 4a is an elevational view of an embodiment of an earstem manufactured from the same material as the frame of FIG. 3a and adapted to be connected thereto.
Figure 4B:
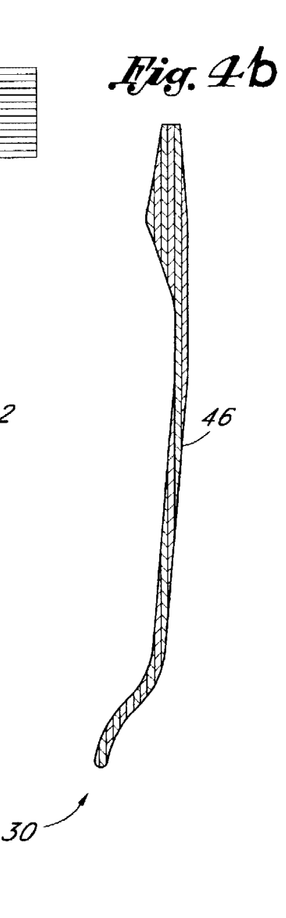

The earstems, shown in FIGS. 4a and 4b, exhibit the same pattern of varying exposures of the laminates due to their contour. As the outer surface 46 of the earstems 30 is relatively flat, the bands 48 formed when looking from the side appear nearly vertical, but with different widths. It will further be appreciated that the angle through the blank 38 at which the earstems 30 or frames 22 are formed determines the width of the laminate bands on the final product, along with the thickness of the laminates. In other words, the large band 49 appearing on the outer surface 46 of the earstems 30 is a result of aligning that particular straight portion of the earstems 30 along one of the individual laminates within the blank 38. Of course, other patterns are possible.

The composite blank 38 formed of a plurality of laminates may be of a variety of materials. In the final form, the frames 22 and earstems 30 are relatively thin and thus the laminates must be strongly bonded together. Although a variety of materials may be used to form the blanks 38, a particularly preferable material is wood. By using thin laminates of wood strongly bonded together, the resulting pattern formed in the frames 22 and earstems 30 exhibits a pleasing cross-grain appearance, enhanced by the fringed borders described above. When using wood, it is preferred to orient the grain axis for each of the laminates 50 in a direction parallel to the plane of the laminates, and desirably parallel to the other grain axes. In this way, forming the contoured shape of the frames 22 and earstems 30 creates the illusion that the spectacles are from a single piece of unlaminated wood. Of course, other grain orientations may be desirable and may even provide a stronger end product.

Figures 5, 6:
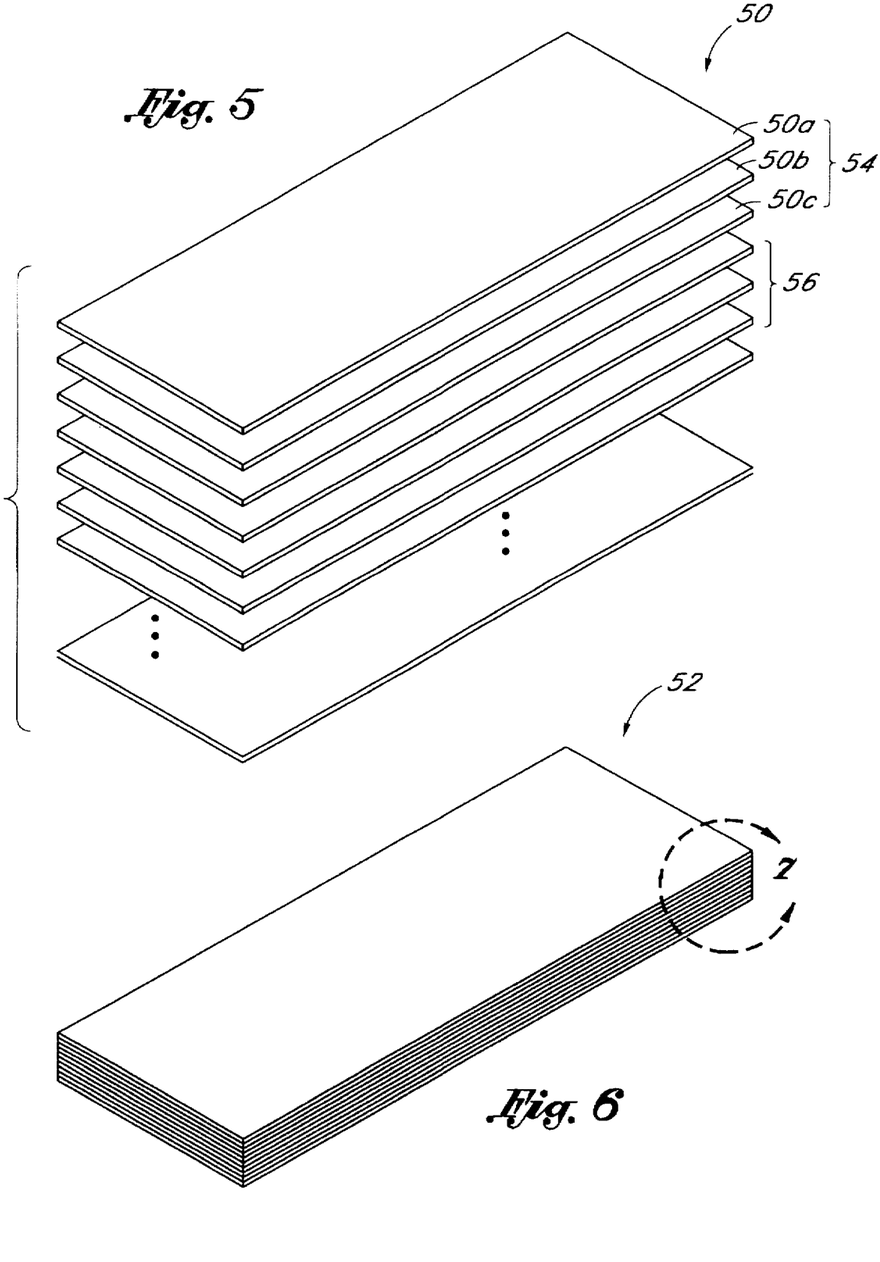
FIG. 5 is an exploded view of a plurality of laminates prior to forming a composite block of densified wood suitable for manufacturing the present sunglasses.
FIG. 6 is a perspective view showing a composite block of densified wood suitable for forming the present sunglasses, illustrating a repeated pattern of laminates therein.

As seen in FIG. 5, a repeated pattern of laminates 50 are joined together to form a block 52, shown in FIG. 6. A first group 54 of three individual laminates 50a, 50b, 50c, are joined to a second group 56 and a third group, etc. The second group 56 and later groups are comprised of the three same types of laminates 50a, 50b and 50c, as in the first group 54.

Figure 7:
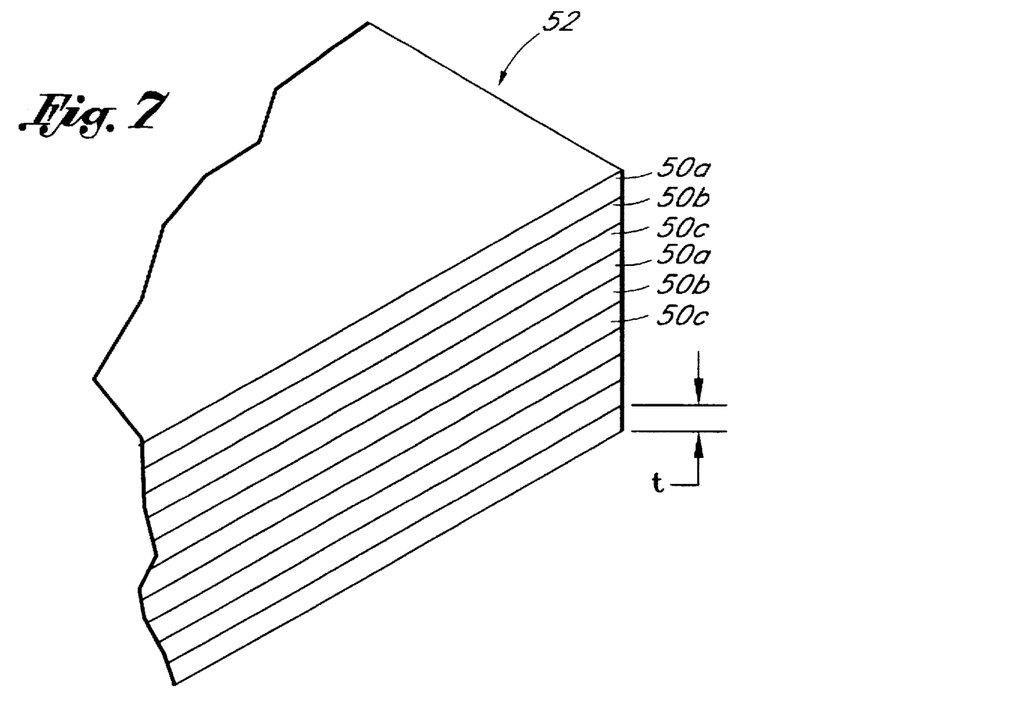
FIG. 7 is a detailed perspective view of one corner of the composite block of wood shown in FIG. 6.

FIG. 7 illustrates a detail of one corner of the block 52. It can be seen that the repeated pattern of three laminates 50a,b,c continues through the block. The individual laminates within each group may be of the same wood but with varying shades or colors, or the laminates may be different types of wood. Various other repeated patterns, or even random patterns, may be formed to achieve a desired effect. FIG. 7 also illustrates the thickness t of one of the laminates 50. This thickness is substantially smaller than the thickness of the frame 22 (in a direction parallel to the plane of the paper in FIG. 3a and perpendicular to the plane of the paper in FIG. 3b) or the thickness of the earstems 30 (in a direction parallel to the plane of the paper in FIG. 4b and perpendicular to the paper in FIG. 4a) so that the preferred multi-layer effect can be obtained upon cutting the frame or earstem contours. This relative thickness is illustrated best in FIG. 2.

In one particularly aesthetically pleasing effect, the laminates 50a,b,c are colored differently to define a regular repeated pattern across the block 52. Subsequently, when the frames 22 and earstems 30 are cut from the block, the repeated colored laminates create repeated bands of color on the exterior of the pieces based on their contour. The colors in any one block 52 may be similar but of slightly differing shades to form an overall red or blue, for example, appearance of the spectacles 20. In contrast, widely different colors may be used to create a bright, vibrant pattern on the spectacle exterior. Some of the possible colors include aqua, indigo, mustard, scarlet, dark brown, reddish brown, charcoal, dark green, burgundy, etc. The natural wood colors may also be accented with dyes to create a natural multi-layer wood grain finish.

The block of wood 52 is preferably comprised of densified wood. As used here, the term densified wood means that the laminates 50 are saturated with a resin, such as a phenolic resin, and are joined together using compression to reduce their thickness. In the preferred embodiment, heat and compression are used to reduce the laminate thickness by at least a factor of 2. Thus, for example, each of the laminates 50a,b,c, may originally have a thickness of ⅟₁₆", but after compression, the thickness of each of the laminates is reduced to approximately ⅟₃₂". The process of densification essentially compresses the cell structure of the wood, which increases the cell wall thickness. In fact, densified wood is no longer buoyant. The increase in cell wall thickness greatly increases the strength of the wood while at the same time reducing the flexibility. Impregnating wood with phenolic resins is not a new science and has been used in the past to construct sculptured models for huge metal dies for automobile parts. When impregnated wood is compressed, it becomes essentially water resistent, and it has been used in the past for crafting knife handles and the like.

The preferred woods for use in the present invention are birch, ash or oak. Of course, other woods may also be used. Further, although the sunglass frames 22 and earstems 30 are preferably manufactured from a block 52 of densified wood, other laminated materials may be used. Densified wood suitable for manufacturing the spectacles 20 is commercially available from Rutland Plywood, of Rutland VT., and also from Fibron Products, Inc., of Buffalo, N.Y.

The preferred densified wood material for manufacturing the sunglass frames 20 provides several other advantages, in addition to the appealing pattern formed by cutting across the laminates. First, the materials are all natural, except for the hinges. The phenolic resin used is a natural occurring resin thus reducing the dangers and costs associated with processing of man-made chemical resins. The use of natural renewable sources such as wood is highly desirable from an environmental perspective. Also, the preferred types of wood used are considered nonendangered and need not be harvested from rain forests. Furthermore, the natural insulating qualities of the wood is desirable as it reduces the amount of heat absorbed by the sunglass frames. Thus, when a pair of the sunglasses are left in the sun on the dashboard of a car, for example, they will not become as hot as thermoplastic sunglasses. Wood frames are also superior to thermoplastic frames, in that thermoplastic is a hydrocarbon-based product, whose original source is oil, a rapidly depleting commodity.

Figure 8:
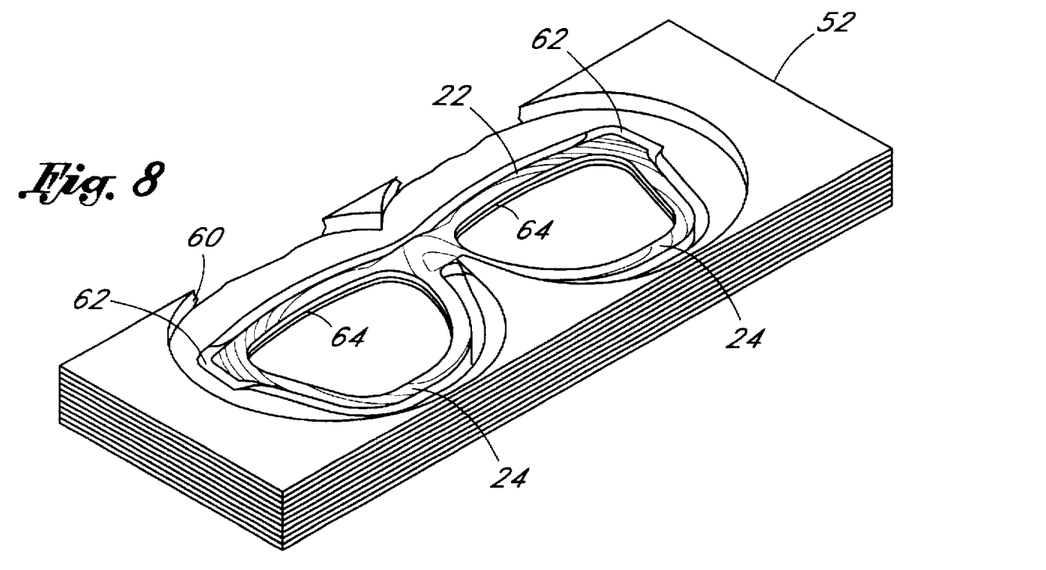
FIG. 8 is a perspective view of a composite block of densified wood such as shown in FIG. 6 having a pair of eyeglass frames partially machined therein.

As shown in FIG. 8, the eyeglass frames 22 and earstems 30 are preferably machined from the blocks of wood 52 using a computer numerical control (CNC) machine. A general outline depression 60 is cut around the periphery of the frames 22, the frame contours are machined, and inner grooves 64 are cut into the rims 24 for receiving and seating the lenses 28, all of which are performed under the control of the computer of the CNC machine.

Figure 9:
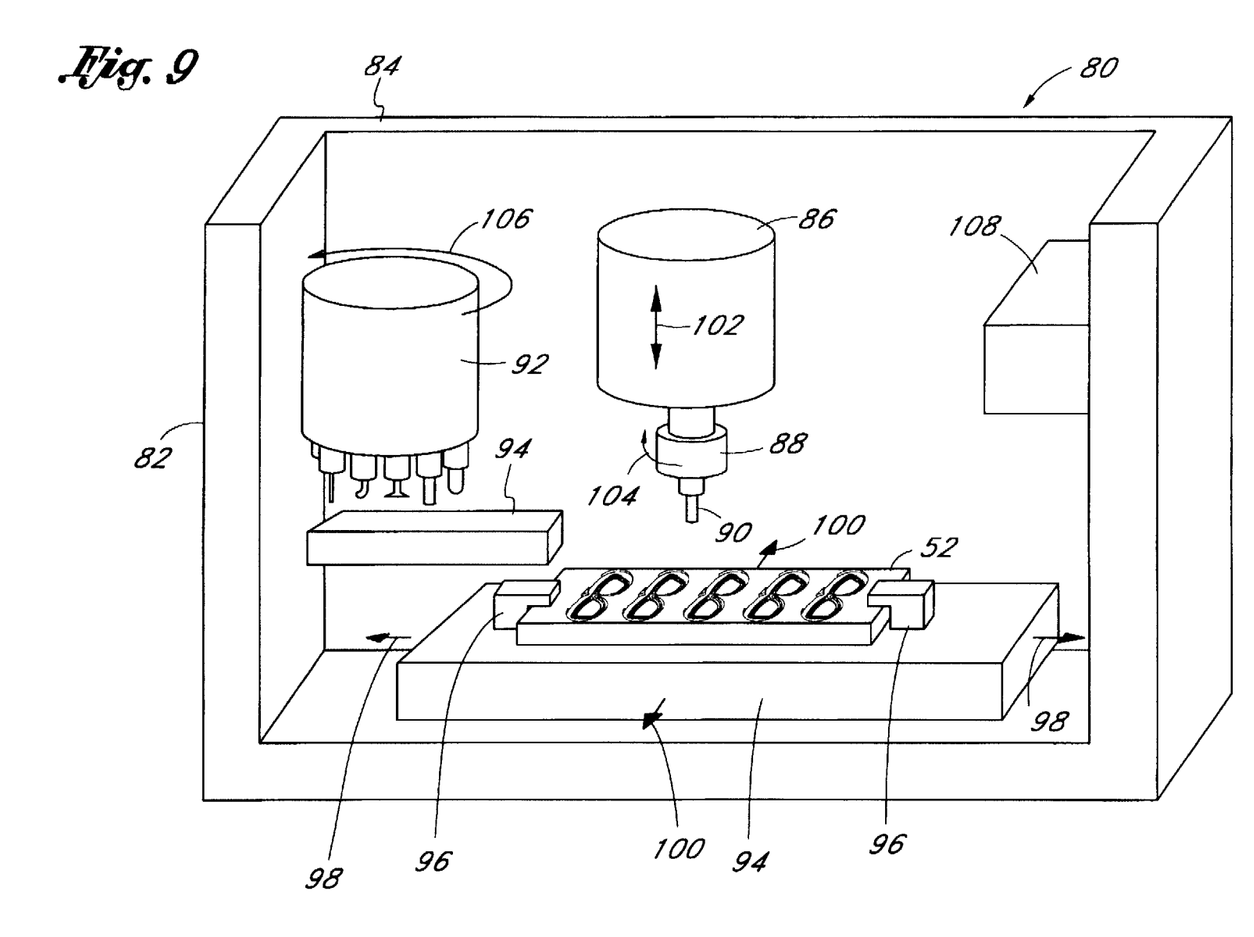
FIG. 9 is a schematic representation of a plurality of sunglass frames being formed from a block in a CNC machine.

The contours of the sunglasses 20 are input into the control mechanism of a CNC machine, such as shown at 80 in FIG. 9, using CAD/CAM technology. In this schematic representation, the machine 80 comprises a large frame 82 having a rear cross-frame 84 which supports a machining turret 86 having a chuck 88 for securely holding a cutting tool 90. Preferably, the machine 80 is provided with a tool changing assembly, such as a rotating multiple tool bit turret 92 and a tool changer 94. By way of example, the CNC machine may be a VMC4020 Vertical Machining Center, manufactured by Fadal. Of course, other CNC machines can be utilized.

As seen in FIG. 9, block 52 of densified wood is placed on a table 94 and is held thereto with the use of clamps 96. The table 94 is capable of movement in a lateral direction, as indicated by the arrows 98, and in a longitudinal direction, as indicated by arrows 100. The machining turret 86 is reciprocal in a vertical direction, as indicated by the double arrows 102. The chuck 88 rotates about a vertical axis, as indicated by the arrows 104. The tool turret 92 is also capable of rotation about a vertical axis, as indicated by the arrow 106. The various relative movements of the drill turret 86 and table 94 are controlled by a controller 108. The controller 108 is programmed with instructions for machining a variety of three dimensional shapes in the block 52. Advantageously, the densified wood can be machined using standard tool bits, although specially shaped bits may also be used. It is preferable to cut in a direction parallel to the grain of the wood in areas of the spectacles which will experience the greatest stress in use. For example, it is desirable to orient the long dimension of the earstems 30 along the grain. Also, this is one reason for aligning the grains of the stacked laminates 50.

Preferably, a plurality of sunglass frames 22 or earstems 30 are machined from a single block 52. When one face of the block 52 has been cut, the block is flipped over and re-clamped on the table 94 to be machined on the opposite face. The ability to form the complete shape of the spectacles 20 by machining only two faces, thus requiring only one re-positioning step, is a great advantage. The end result is the nearly finished sunglass frame 22 or earstem 30 shape, as seen in detail in FIG. 8. In an alternative method of manufacture, a plurality of individual veneers are machined into the shapes of various cross-sections of the frames 22 or earstems 30. Subsequently, the shaped veneers are stacked and bonded together to form a laminated piece. The laminated piece is then subjected to compression, and possibly heat, to densify the veneers. A mold in the shape of the particular piece can be used to apply the pressure. The rough piece is then finished into the densified wood spectacles.

Figure 10:
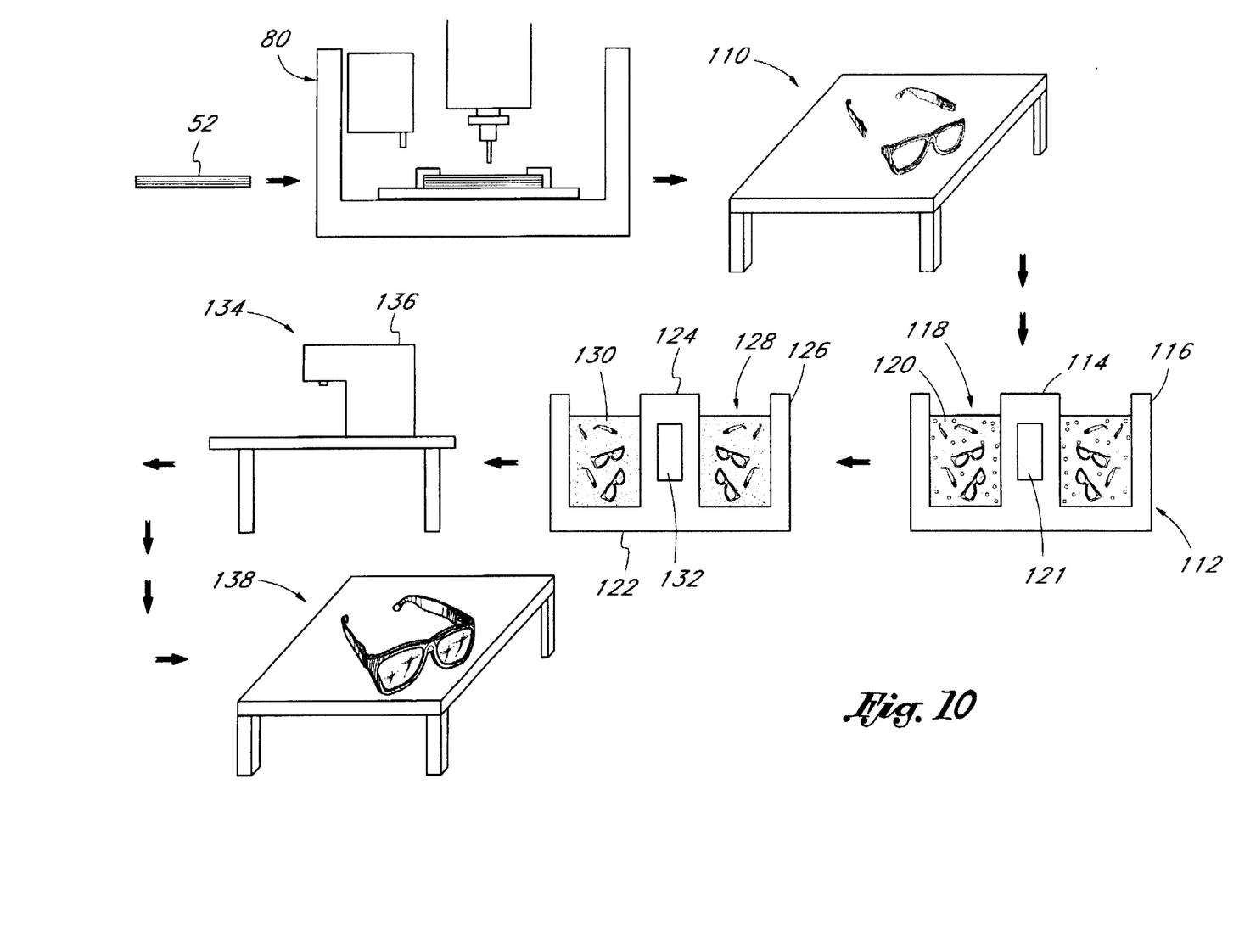
FIG. 10 is a schematic representation of the manufacturing process steps for forming the composite sunglass frames and earstems.

Now with reference to FIG. 10, in the preferred manufacturing method the sunglasses 20 are formed in an assembly line manner. The block 52 is introduced into the CNC machine 80 and is subject to the aforesaid machining operations. After both sides of the block 52 are cut, the rough frames 22 and earstems 30 are separated from the remaining portion of the block 52. Typically, a small bridge 62, as seen in FIG. 8, on opposite sides of each respective piece remains holding the piece to the block 52. The pieces, either frames 22 or earstems 30, are gently broken off from the remaining block 52 manually.

At this point, the sunglass pieces are transferred to a workstation 110, where the hinge parts are attached. The hinge parts will be described more fully below with reference to FIG. 11. After the workstation 110, the pieces are placed within a first vibratory tumbler 112 having a central hub 114 and a surrounding wall 116. The hub 114 and wall 116 define an annular space 118 therein. A plurality of "sanding stones" 120 fill the space 118. The sanding stones 120 act to gently smooth the frames 22 and earstems 30. The sanding stones 120 may be conically shaped plastic media having a base diameter of ¾". Water may be added to assist in sanding the sunglass pieces. The tumbler 112 is vibrated by a central vibrator 121 to cause the sanding stones 120 to rub against the frames 22 or earstems 30.

After the frames and earstems have been smoothed by the first tumbler 112, the frames 22 and earstems 30 are transferred into a second vibratory tumbler 122. The second tumbler 122 also includes a central hub 124 and an outer wall 126, together defining an annular space 128 therebetween. The space 128 is filled with a particulate composition 130 of granular material, such as corncob grit and small particles of wax, or petroleum-based polish. When the frames 22 and earstems 30 are placed within the annular space 128, a vibrator 132 causes the tumbler 122 to vibrate. As the sunglass pieces are sifted through the particulate matter 130, they are highly polished by the corncob grit and a thin coat of wax is applied at the same time.

After a specified time in the second tumbler 122, the frames 22 and earstems 30 are transferred to a workstation 134 having a laser engraving apparatus 136. A unique serial number or other distinctive mark is applied to either the frames 22 or earstems 30. Subsequently, the frames 22 and earstems 30 are attached to each other by the hinges 32 at a final workstation 138.

The lenses for the sunglasses 20 are then inserted within the rims 24. The lenses may first be frozen to shrink them slightly before fitting into the inner grooves 64 of the rims 24. The preferred lenses for the present sunglasses 20 are dual polarized polycarbonate lenses. One desirable lens is manufactured by BluBlocker Optical of Ukiah, Calif. The lenses 28 may also be made of cast resin, or other materials may be used, although glass is very difficult to fit within the frames, as both the glass and the densified wood are quite rigid.

Figure 11:
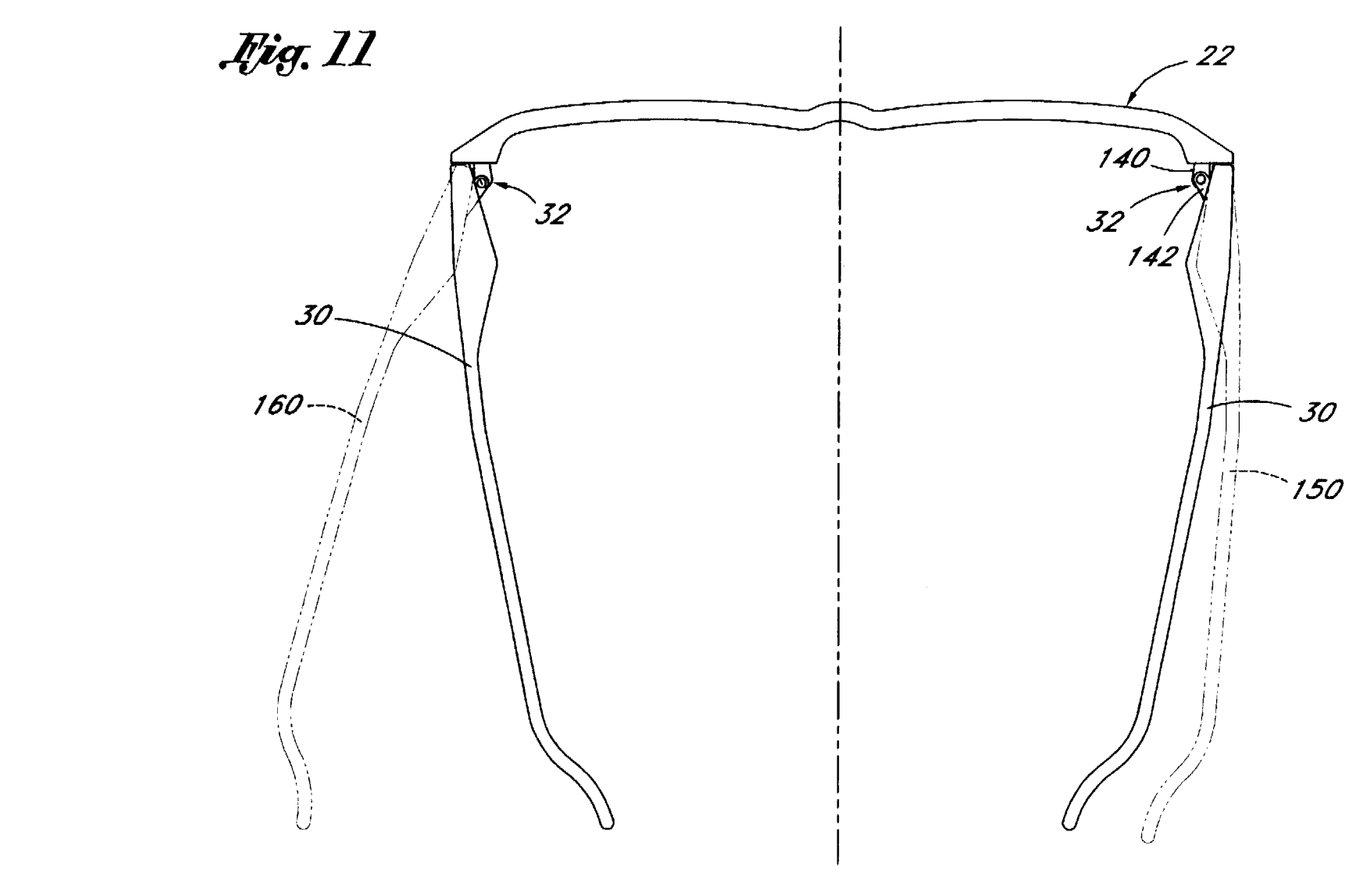
FIG. 11 is a top plan view of the composite sunglasses of FIG. 1 illustrating the range of motion of the hingedly connected earstems.

The spring hinges 32 used for the sunglasses 20 are shown in FIG. 11. Each hinge 32 is comprised of a male member 140 and a female member 142. The male member 140 is mounted in a recess in a rear surface of either temple 34a,b of the frames 22. The female members 142 are mounted in a longitudinal groove opening to the front end of each of the earstems 30. The male member 140 includes a rearwardly extending flange having a throughbore which fits between a clevis on the female member 142. The clevis includes throughbores aligned with the throughbore of the flange and a pivot pin may be inserted through all three to provide the hinge connection. The female member includes a base portion fixed with respect to the earstem 30 and a sliding portion having the clevis and adapted to slide on the base portion. The sliding portion is biased in a direction away from the frame 22 by an internal spring. One source of such a spring hinge is Comotec of La Doye 39400, Morez, France.

FIG. 11 illustrates the spring action of the hinges 32. The right earstem 30 is shown in dashed lines in a position 150 slightly angled toward the left earstem. This represents a relaxed position of the internal spring. A front corner of the right earstem 30 is in contact with a rear surface of the frame 22 in the position 150. Outward movement of the earstems 30 to the solid line positions, shown on both right and left sides, causes the sliding portion of the female hinge member 142 to slide against the bias of the internal spring due to the lever action between the earstems 30 and the frame 22. The solid line positions represent the angle at which the earstems 30 make with the frame 22 for an average wearer, that is, nearly perpendicular to the frame 22. Of course, due to the inward bias of the earstems 30 between the solid line position and the inner position 150, the sunglasses 20 will grip the sides of wearers with narrower heads. For even larger heads, or in case the earstems 30 are caused to swing outward from the perpendicular position, the spring hinges 32 allow outward movement to the position 160 shown in dashed lines on the left side. The total range of movement may be at least 300 from the position 150 to the position 160. The spring hinges 32 provide a flexibility of movement which protects against overstressing the relatively rigid earstems 30 in bending.

Although this invention has been described in terms of certain preferred embodiments, other embodiments that are apparent to those of ordinary skill in the art are also within the scope of this invention. Accordingly, the scope of the invention is intended to be defined by the claims that follow.

What is claimed is:

1. Spectacles, comprising:

a frame formed of densified wood;

earpieces attached to said frame.

2. The spectacles of claim 1, wherein said frame of densified wood comprises two eyepiece frames formed of densified wood.

3. The spectacles of claim 1, wherein said densified wood comprises plural laminations, each of said laminations being smaller than the thickness of said frame.

4. The spectacles of claim 1, wherein said densified wood comprises laminated wood, at least some of said laminations being of different colors, said frame contoured to provide an exterior surface which exposes plural ones of said laminations of different colors to make said frames multi-colored.

5. The spectacles of claim 1, wherein said densified wood comprises wood saturated in resin.

6. The spectacles of claim 5, wherein said resin comprises phenolic resin.

7. Spectacles, comprising:

a frame formed of stacked laminations of densified wood; and earpieces attached to said frame.

8. The spectacles of claim 7, wherein said frame of densified wood comprises two eyepiece frames formed of densified wood.

9. The spectacles of claim 8, wherein earpieces are formed of densified wood.

10. The spectacles of claim 7, wherein said laminations are thinner than the thickness of said frame.

11. The spectacles of claim 7, at least some of said laminations being of different colors, said frame contoured to provide an exterior surface which exposes plural ones of said laminations of different colors to make said frames multi-colored.

12. A method of manufacturing a spectacle frame, comprising cutting a frame from material formed of stacked laminations of densified wood.

13. The method of claim 12, wherein said step of cutting comprises cutting said material with a bit of a computer controlled machine.

* * * * *